United States Patent [19]

Debuisser

[11] Patent Number: 5,124,710
[45] Date of Patent: Jun. 23, 1992

[54] COHERENT PULSE RADAR SYSTEM AND METHOD FOR THE DETECTION OF A TARGET PRESENTING FLASHES OF VERY SHORT DURATION

[75] Inventor: Jean-Claude Debuisser, Montigny le Bretonneux, France

[73] Assignee: Le Centre Thomson D'Applications Radars, Velizy Villacoublay, France

[21] Appl. No.: 628,165

[22] Filed: Dec. 17, 1990

[30] Foreign Application Priority Data

Dec. 19, 1989 [FR] France .................. 89 16789

[51] Int. Cl.[5] .................. G01S 7/288; G01S 7/292
[52] U.S. Cl. .................. 342/204; 342/90; 342/192
[58] Field of Search .................. 342/204, 192, 193, 90

[56] References Cited

U.S. PATENT DOCUMENTS

| | | | |
|---|---|---|---|
| 3,526,894 | 9/1970 | Guilhem | 342/111 |
| 3,733,603 | 5/1973 | Johnston | 342/192 |
| 4,110,752 | 8/1978 | Neri | 342/77 |
| 4,275,396 | 6/1981 | Jacomini | 342/93 |
| 4,346,382 | 8/1982 | Bosc et al. | 342/192 |
| 4,389,647 | 6/1983 | Fanucle et al. | 342/192 |
| 4,499,467 | 2/1985 | Rittenbach | 342/109 |
| 4,513,288 | 4/1985 | Weathers et al. | 342/201 |
| 4,635,058 | 1/1987 | Sutphin, Jr. | 342/52 |
| 4,816,833 | 3/1989 | Ferguson et al. | 342/95 |
| 4,920,347 | 4/1990 | Kurihara | 342/130 |

FOREIGN PATENT DOCUMENTS 187397 7/1986 European Pat. Off. .
336273 12/1989 European Pat. Off. .

OTHER PUBLICATIONS

Kretschmer, Jr., "New Radar Pulse Compression Waveforms," Proceedings of the 1988 IEEE National Radar Conference, Ann Arbor, Mich., Apr. 20-21, 1988, pp. 194-199.

Primary Examiner—John B. Sotomayor
Attorney, Agent, or Firm—Pollock, VandeSande & Priddy

[57] ABSTRACT

This radar system comprises an emitter (3, 4, 5) for the transmission of coherent non-equidistant pulses forming a periodic pattern and being distinguished from each other by a phase modulation according to different quasi-orthogonal laws, the average interval between pulses being of the order of magnitude of the minimum duration of the flashes. For reception, the system comprises a single receiver (7) and a device (8) for coherent elimination of the clutter and echoes of the target bodies, followed by N processing channels for pulse compression (9.1 to 9.N) by correlation with the particular phase modulation laws. The outputs from the processing channels are sent to a device (11) for elimination of secondary peaks due to partial ambiguities.

The invention applies to radar surveillance systems for helicopter detection.

11 Claims, 8 Drawing Sheets

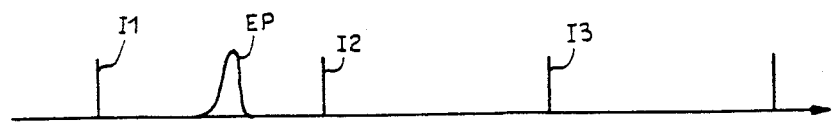
FIG_1A
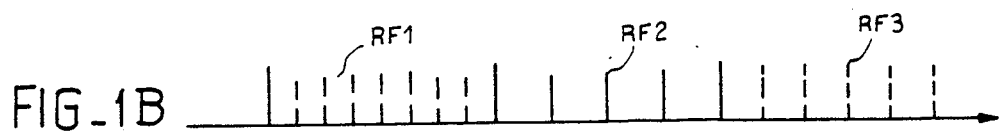
FIG_1B
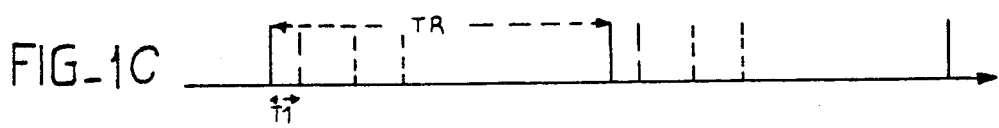
FIG_1C
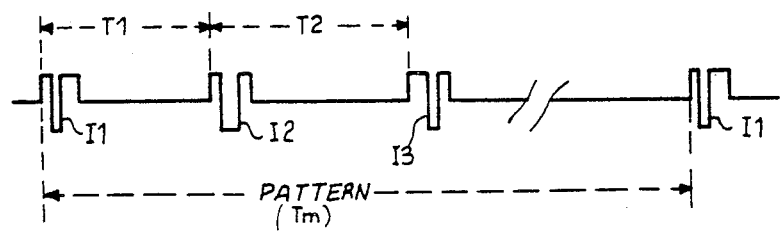
FIG_2
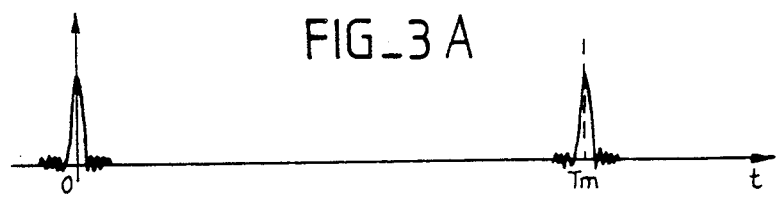
FIG_3A
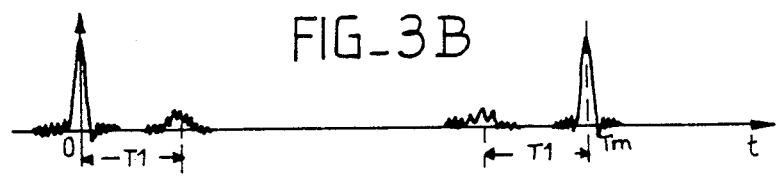
FIG_3B

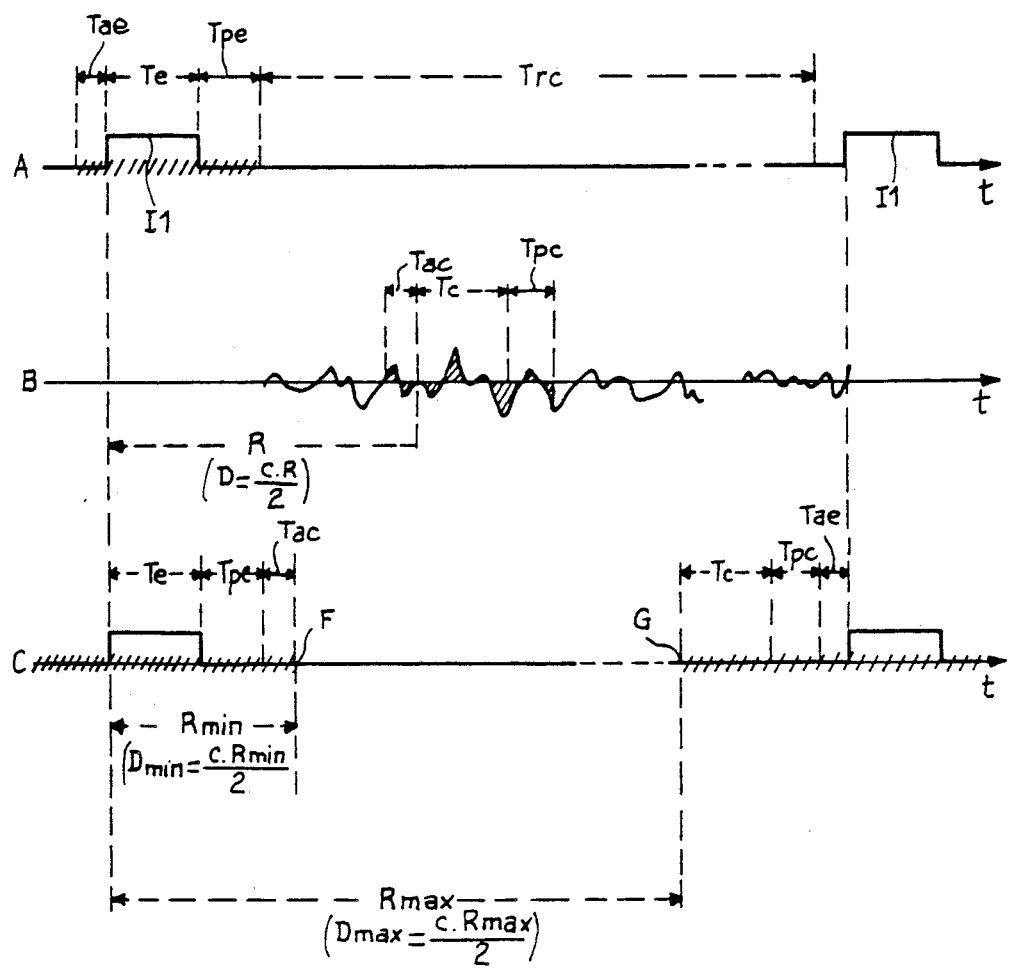

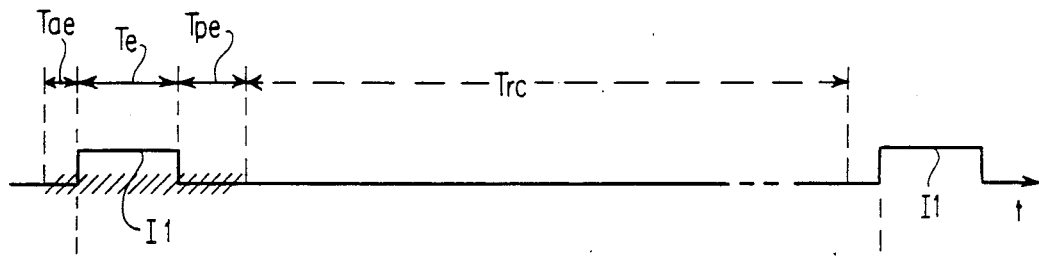
FIG_4A
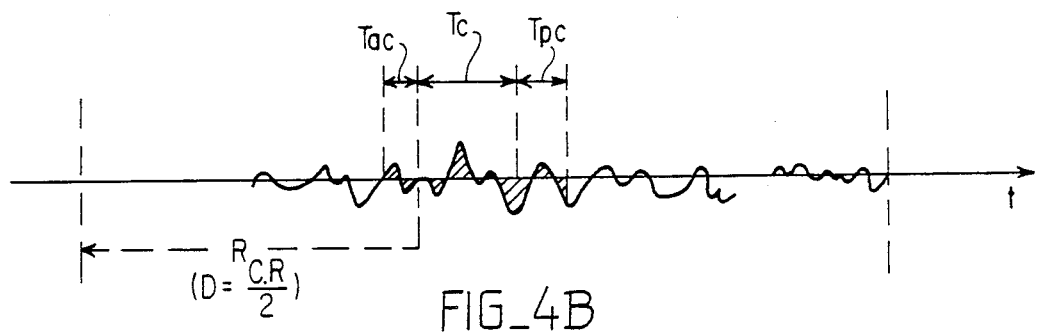
FIG_4B
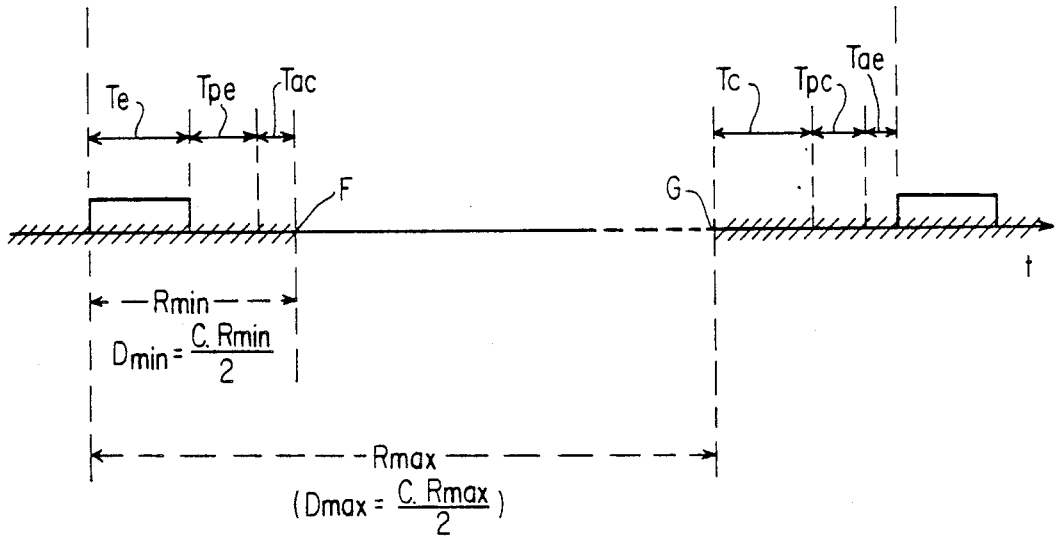
FIG_4C

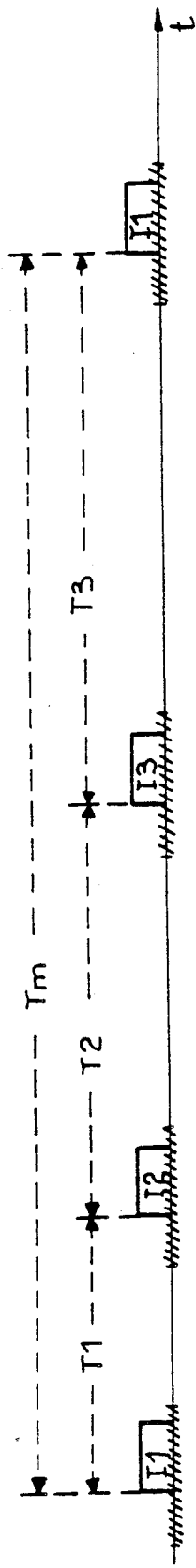
FIG_5A
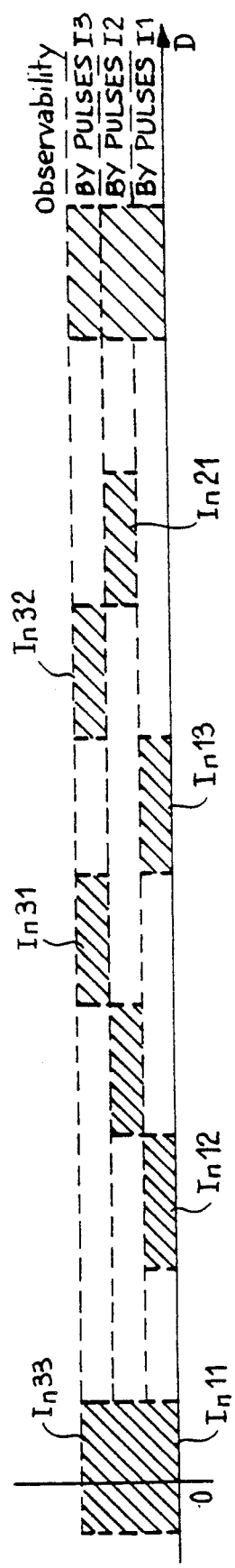
FIG_5B
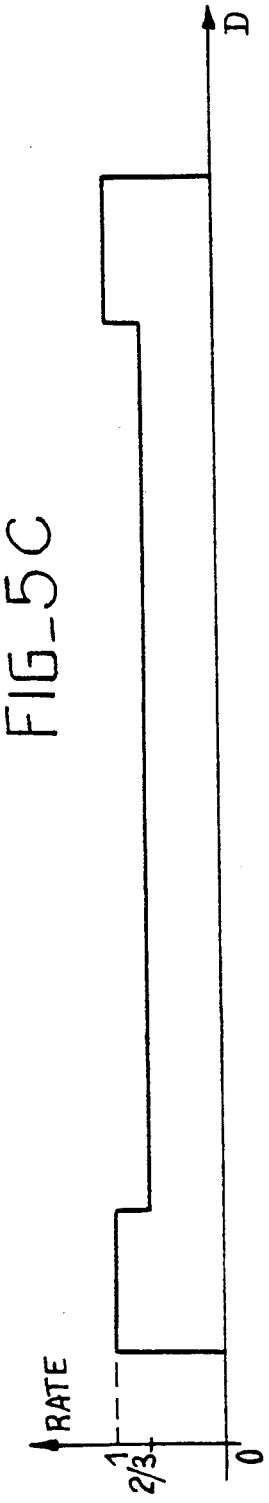
FIG_5C

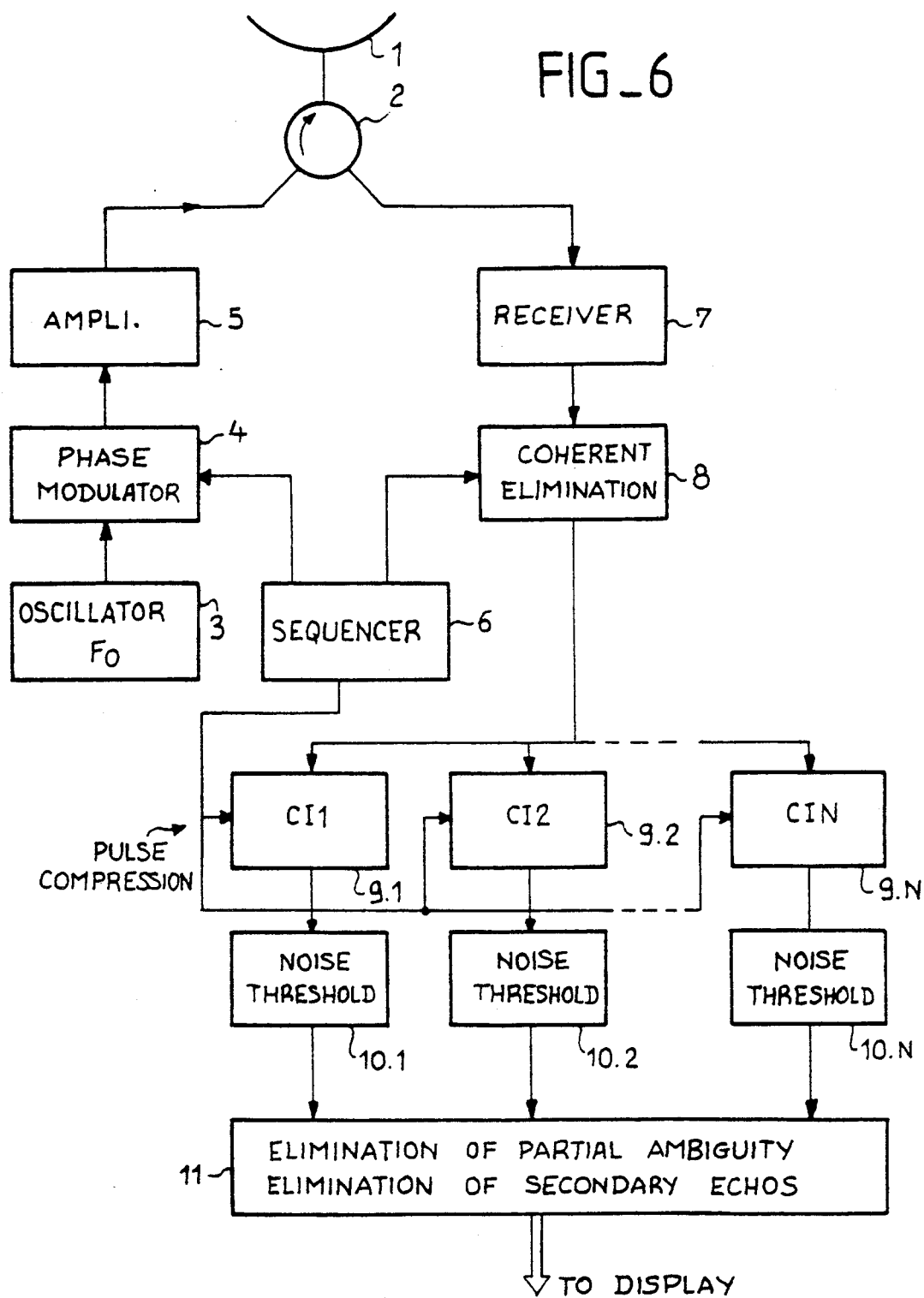

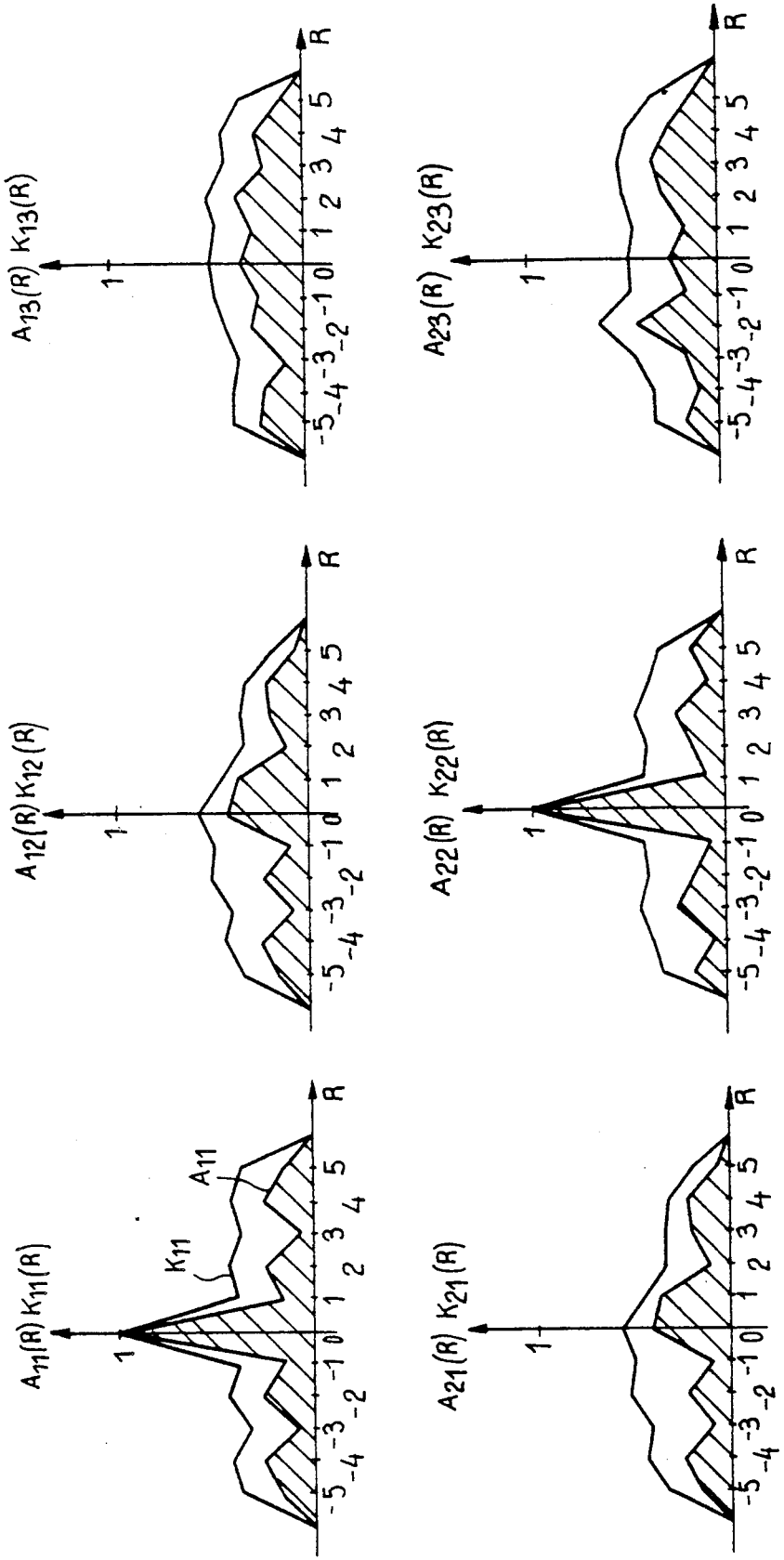

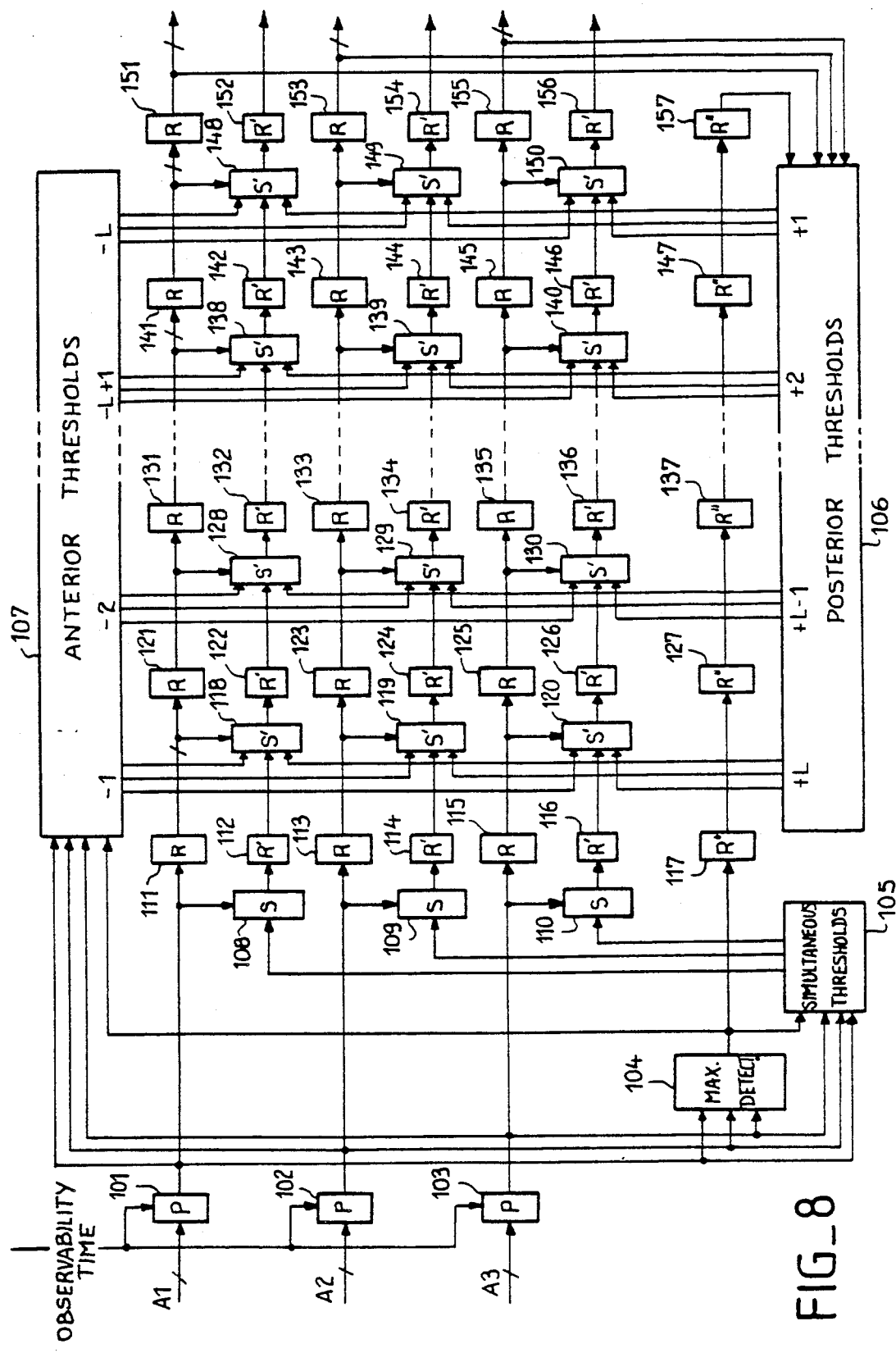
FIG_8

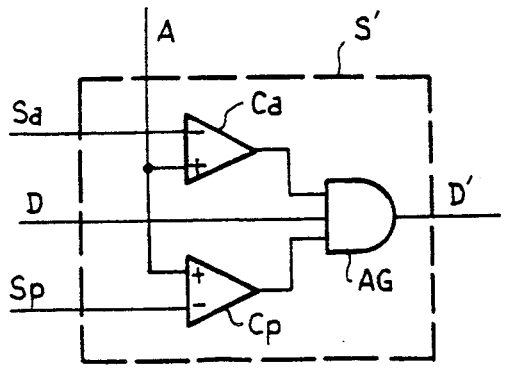
FIG_9
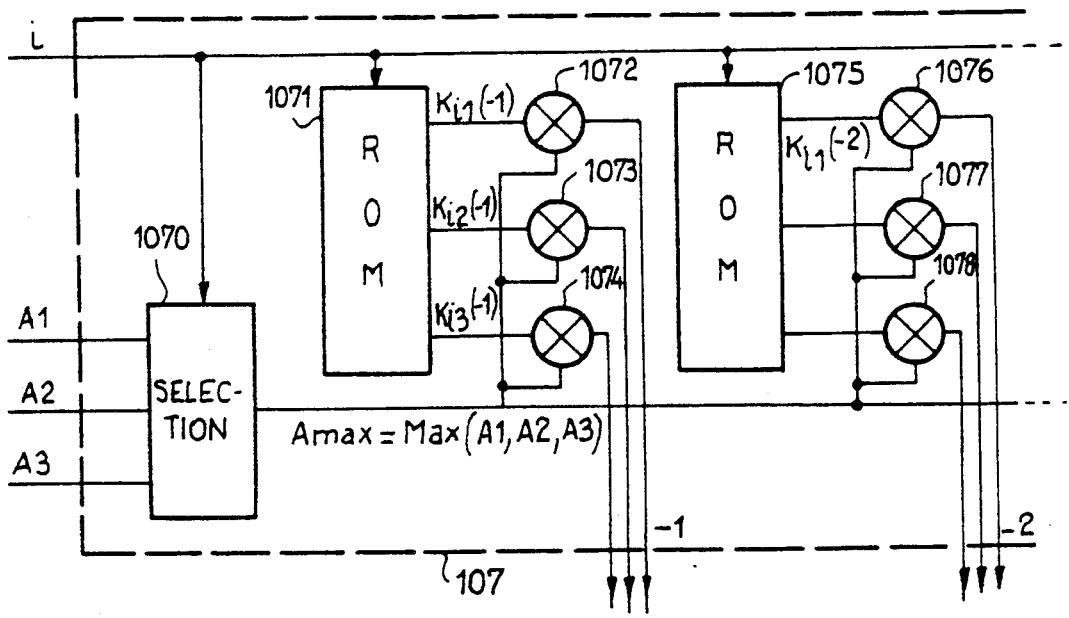
FIG_10

COHERENT PULSE RADAR SYSTEM AND METHOD FOR THE DETECTION OF A TARGET PRESENTING FLASHES OF VERY SHORT DURATION

BACKGROUND OF THE INVENTION

This invention concerns a coherent pulse radar system and process with no distance ambiguity for the detection of a target presenting flashes of very short duration and high period, notably helicopters.

Certain surveillance radars seek in particular to detect agitated targets whose equivalent radar surface may not be great enough to be detected except during very short moments. This may be the case, for example, for helicopters which need to be recognized as such. An essential characteristic of helicopters, from the point of view of the radar cross-section, is that their main rotor blades give a very high cross-section only when they are in the neighborhood of a plane perpendicular to the radar-helicopter direction. This configuration is repeated periodically with a high period, for example, about 20 to 100 milliseconds, but lasts only for a very short time, giving rise, for example, to a "flash" of a duration of approximately 50 to 200 microseconds.

For a pulse-type radar to have a sufficient probability of detecting these blades, an interval between pulses must be chosen which is of the same order of magnitude as the duration of the blade flashes. If a radar with periodic pulses is used, which is necessary in order to eliminate parasite echos properly, periods of repetition must be used. This leads to maximum non-ambiguous distances of the order of twenty kilometers, thus too short in many cases for the distance coverage required.

A first solution envisaged is to use pulses of high repetition frequency and, to eliminate the distance ambiguities, to emit successive bursts of pulses with different repetition periods. A disadvantage of this solution is that the target observation time necessary is greatly increased, so it is nearly impossible to track the target.

Another known solution, described for example in French patent no. 77 38830, consists of using blocks of pulses with a constant repetition frequency which is different from one block to another. These blocks are interlaced and the pulses from a block being recognized by their carrier frequency, which differs from one block to another. But in this case too, to eliminate the distance ambiguity, the observation time is long.

A solution derived from this one would consist of using interlaced bursts with a constant low repetition frequency (therefore without distance ambiguity for the radar cover envisaged), each burst using a different carrier frequency. However, this solution, like the preceding one, requires N emitters and N receivers of different carrier frequencies, which means complex, bulky and costly equipment.

SUMMARY OF THE INVENTION

The aim of the invention is to remedy these disadvantages working from the fact that the blade flashes are rare in time and in distance, for there are generally few helicopters in a radar's surveillance field. This means that partial distance ambiguities can be tolerated.

In accordance with the invention, instead of using different carrier frequencies, the pulses of a periodic pattern will be differentiated by applying to them phase modulations which are different and preferably pseudo-orthogonal (with low intercorrelation), the modulation being coherent for all the pulses.

According to the invention there is thus provided a method for detection without distance ambiguity, by a coherent pulse radar, of a target presenting flashes of very short duration and high period, notably helicopters, characterized by the fact that it consists in:

periodically emitting a pattern of N pulses all with the same carrier frequency, coherent with each other and each phase modulated by a different law, the intervals between the pulses of a pattern all being different, close to the period of the pattern divided by N and of the same order of magnitude as the duration of the flashes;

receiving the pulses at a single receiver followed by N processing channels adapted respectively to the said laws of modulation to perform a pulse compression; and eliminating the secondary peaks received by comparing the levels received in each channel.

One of the advantages of such a method is that a single emitter and a single receiver can be used, the receiver being followed by N sub-receivers or signal processing channels corresponding to the various pulses.

BRIEF DESCRIPTION OF THE DRAWINGS

The invention will be better understood and other characteristics and advantages will appear on examining the description below and the appended drawings where:

FIGS. 1a-1c represent explanatory diagrams;

FIG. 2 shows the diagram of the pulses emitted according to the invention;

FIGS. 3a and 3b represent explanatory ambiguity diagrams of the invention;

FIGS. 4a-4c represent a series of curves defining the parameters affecting the observability time of the radar according to the invention;

FIGS. 5a-5c shows curves explaining the choice of intervals between pulses according to the invention;

FIG. 6 is the bock diagram of a radar system according to the invention;

FIGS. 7a-7f represent diagrams explaining the principle of elimination of secondary peaks according to the invention;

FIG. 8 is the diagram of a device for elimination of secondary peaks usable in the system according to the invention;

FIG. 9 is the detail of a circuit of the device in FIG. 8, and

FIG. 10 is the detailed diagram of a threshold calculation device used in the device in FIG. 8.

DESCRIPTION OF THE PREFERRED EMBODIMENTS

As has already been explained in the introduction to the present description, if, in a periodic-pulse radar, the interval between pulses I1, I2, I3 is too long with respect to the duration of a blade flash EP (curve A in FIG. 1), there is a risk that this flash will not be detected if no pulse is present at the moment when the equivalent radar surface of the blade is high. One of the possible solutions to this problem consists of emitting bursts of pulses RF1, RF2, etc., at different high repetition frequencies (diagram B in FIG. 1), which means, as has been stated, an observation time which is too long for certain applications.

According to the invention and as given in diagrammatic form in FIG. 2, a periodic pattern of N pulses I1, I2, I3 is emitted (to simplify the drawings we have chosen N=3) all with the same carrier frequency, coherent with each other, but each phase modulated by a different law. In addition, these pulses are separated by intervals T1, T2, etc. which are all different but close to the period Tm of the pattern divided by N. This average period Tm/N is chosen to be of the same order of magnitude as the minimum duration of the flashes to be detected. The period Tm of the pattern is chosen so that it corresponds to a range ambiguity greater than the distance coverage required.

Phase modulation laws are chosen to be pseudo-orthogonal, i.e. they have low intercorrelation function values. This is important for good operation of the system, as will be seen below.

A radar system using this principle according to the invention has only one emitter, emitting the successive pulses at the same carrier frequency but with an appropriate phase modulation, and a single receiver followed by N signal processing channels each acting as a particular pulse compression channel, i.e. corresponding to one pulse of the pattern.

The filtering to eliminate parasitic echos is performed for each pattern and therefore has the same efficiency as in a radar without distance ambiguity with periodic pulses.

Nevertheless, the radar system according to the invention presents partial distance ambiguities. As the phase modulation laws are not perfectly orthogonal (intercorrelation products not equal to zero), an echo of a blade flash, corresponding to a particular pulse, will give a main peak in the corresponding channel but also non-null secondary peaks in the other channels.

This is shown in diagrammatic form in FIG. 3 where A shows the ambiguity diagram of a single sub-receiver (or processing channel) with its main peaks and B the ambiguity diagram of a sub-receiver in the presence of another, for example those corresponding to the pulses I1 and I2. We then find secondary peaks at intervals of T1 from the main peaks which correspond to partial distance ambiguities. However, taking into account the pseudo-orthogonal characteristics chosen for the modulation laws, the secondary peaks are of sufficiently low amplitude to be eliminated by comparison with the amplitudes received at every instant in the various processing channels, as will be seen below.

Another problem is due to the fact that during emission of each pulse by the emitter, all the processing channels are blocked. To avoid having a completely blind zone of distance, it is necessary to avoid having a constant spacing between successive pulses. On the other hand it is perfectly tolerable that for any given distance, one or a few processing channels are blind if the others are not. This leads to definition of possible laws of distribution of the intervals between successive pulses which meet the above requirements.

We shall now define, as an example, a law of distribution of these intervals which is simple to use and efficient.

For this purpose, we shall first define a number of important parameters in relation to FIG. 4.

Diagram A represents what happens to the radar system during the emission of a pulse. All the processing channels are blocked not only during the duration Te of the pulse emitted, for example I1, but also during a pre-emission time Tae and a post-emission time Tpe. The reception time is therefore Trc.

In the same way, in each sub-receiver or processing channel, the correlation with the modulation law is performed for a delay R corresponding to a distance D=c.R/2 (c speed of the electromagnetic wave) over a duration Tc equal to Te which must be preceded by a precorrelation time Tac and followed by a post-correlation time Tpc (diagram B in FIG. 4).

Diagram C then enables the observability field of the radar system for the channel concerned to be defined. A correlation can be correctly performed and a target detected only between a minimum distance Dmin=c.Rmin/2 where Rmin=Te+Tpe+Tac (point F) and a maximum distance Dmax=c.Rmax/2, ending at the point G preceding the beginning of the following pulse by a duration equal to Tc+Tpc+Tae. Thus for each pulse an inobservability domain is defined of duration Tc+Tpc+Tae+Te+Tpe+Tac.

This being so, in FIG. 5 is shown the time diagram of a pattern of three pulses I1, I2, I3, (three pulses only for clarity of the figures). The duration of the pattern is Tm. Each pulse is separated from the following one by a different interval, T1, T2 and T3 respectively. Each pulse defines an inobservability domain represented by shading. If Tq is the duration of such a field and Tq is chosen as the time quantification step, the durations Ti (i=1, 2 or 3) are expressed in numbers. If these numbers are appropriately chosen, we can see in diagram B of FIG. 4 that it is possible to make none of the inobservability fields of each of the channels overlap, except at the beginning of each pattern which is inevitable. To obtain this result, intervals must simply be chosen such that all the numbers Ti, Ti⊕1, Ti+Ti⊕1+Ti⊕2, . . ., Ti+Ti⊕1+. . . +Ti⊕N⊖2 are different, the symbols ⊕ and ⊖ representing additions and subtractions modulo N. In diagram B, the shaded zones In 11, In 12, and In 13 represent the fields of inobservability due to pulses I1 in channel 1, etc.

Diagram C represents the consequent observability ratio of the distances D. As a function of the number N of channels and the choice of spacing, the minimum observability time can be set.

FIG. 6 represents the diagram of a radar system using the principles set out above. The radar system is equipped with a joint emission/reception antenna 1 connected to a circulator 2. The emitter connected to this circulator comprises an oscillator 3 at the carrier frequency $F_o$, a phase modulator 4 and an amplifier 5. The wave supplied by the oscillator 3 is pulse modulated and, within each pulse, is phase modulated under the control of a sequencer 6 which synchronizes the pulses and gives the adequate modulation laws (codes).

The circulator 2 is also connected to a single means of reception which comprises the receiver 7 and the device 8 for coherent elimination of clutter and the echo of target bodies by linear filtering. Such a device may, for example, be a filter with autoregressive processing of the signal. This filter comprises, in known manner, a lattice filter of order 1 and a device for computing the coefficient $a_{n-1}$ of the lattice filter. In known manner, the filtering coefficient can be calculated recursively from the coefficient of the preceding recurrence and an estimate of the coefficient at the recurrence under consideration. As is known, the lattice filter supplies direct signals $\vec{p}_n$ and retrograde signals $\vec{r}_n$ for each resolution cell according to the equations:

$$\vec{p}_n = \vec{y}_n - \vec{a}_n - 1\vec{y}_n - 1$$

$$\vec{r}_n = \vec{y}_n - 1 - \vec{a}^*_n - 1\vec{y}_n$$

where $\vec{y}_n$ is the input signal of the recurrence n and the symbol * means "conjugate of".

These signals $\vec{p}_n$ and $\vec{r}_n$ are carriers of the same information concerning the flashes, but the echo of the target body has been eliminated. An intercorrelation between these signals $\vec{p}_n$ and $\vec{r}_n$ can be performed to obtain the output signal from the device 8.

This output signal is applied in parallel to N processing channels each corresponding to a particular pulse in the pattern, i.e. to a particular pulse compression from the corresponding phase modulation law. Each processing channel has a device 9.1 to 9.N for pulse compression (CI1 to CIN), which receives from the sequencer 6, the counterpart of the phase modulation law used on emission to perform a correlation with the received signal, and a threshold circuit 10.1 to 10.N intended to eliminate the noise. The amplitudes in digital form supplied to these threshold circuits are set to zero if they are less than the noise threshold.

The outputs from the N channels are applied to a device 11 for elimination of secondary peaks due to partial ambiguities. This device is intended to retain only the signals corresponding to an effective blade flash detection, i.e. the main peaks. These main peaks detected are transmitted to means of display not shown here.

FIG. 7 enables the principles on which is based the operation of the device 11 to be better understood. Always supposing for the sake of simplification that there are only three channels, the diagrams in the first line of FIG. 7 represent, for a main peak in channel 1 (echo of blade flash for pulse I1), the amplitude $A_{11}(R)$ of the compressed signal in channel 1 corresponding to the autocorrelation function for the modulation law of pulse I1, R being the delay, and the amplitudes $A_{1j}(R)$ in channels 2 and 3 corresponding to the intercorrelation functions of the modulation law of I1 with the corresponding laws in channels 2 and 3, which translate the signal received in channels 2 and 3 for a flash detected in channel 1.

Similar diagrams have been represented on the second line of diagrams in FIG. 7 for a major peak detected in channel 2.

From these diagrams it can be seen that when a main peak is detected in one channel, the amplitudes in the other channels at the same instant R=0 are considerably lower. A set of threshold coefficients $K_{ij}(R)$ can then be defined for each channel enabling thresholds $S_{ij}(R) = A_i \cdot K_{ij}(R)$ to be calculated for a maximum amplitude $A_i$ found in channel i, which, if this amplitude is indeed that of a main peak, are all greater than the corresponding amplitudes $A_{ij}(R)$ of the various channels. If this is not the case, the maximum amplitude found does not correspond to a main peak.

It can be noted that as a general rule $A_{ij}(R) = A_{ji}(R)$ which implies that:

$$K_{ij}(R) = K_{ji}(R)$$

From this it is possible to design a device for the elimination of secondary peaks such as that represented in FIG. 8.

The amplitudes A1, A2, A3 presented at the output from each of the processing channels at each time unit (moment of modulation laws) are first applied to validation gates P 101 to 103 controlled by the observability times of each sequence of pulses I1, I2 or I3 (see FIG. 5). During the observability times, the amplitudes are transmitted without modification, and during the inobservability times, the gates P transmit a zero value. After passing through the gates 101 to 103, the amplitudes are applied to shift register type circuits with L+1 registers 111, 121, ..., 151 for channel 1, 113, 123, ..., 153 for channel 2, etc., where L is the number of moments of each modulation law, the progression in these registers occurring at the rate of the elementary time units.

Moreover, the amplitudes of the three channels are applied to a maximum detector circuit 104 which gives at its output the number i of the channel with the maximum amplitude at the instant considered. These amplitudes are also applied to a circuit 105 for calculation of thresholds known as simultaneous thresholds, which, in response to the number and the value of the maximum amplitude, supplies thresholds $S_{ij}(O)$ corresponding to the coefficients at the instant O of one of the three possible configurations (FIG. 5) depending on the channel with a maximum. These thresholds are compared to the amplitudes $A_i$ in the respective comparators S 108 to 110 to give a detection bit D equal to 1 if the threshold is equal to or less than the corresponding amplitude and equal to 0 if the threshold is higher. This bit is then communicated to the following stage via a register R' 112, 114, 116. All the other stages are thereafter identical and each includes a comparison circuit S' (for example 118 to 120 for stage 1) followed by a register R' (for example 122, 124, 126 for stage 1).

A comparison circuit, as represented in FIG. 9, includes two comparators Ca, Cp, receiving the amplitude A of the corresponding channel delayed by from 1 to L time units depending on the stage under consideration and a respective anterior threshold $S_a$ or posterior threshold $S_d$, and an "AND" gate AG receiving the outputs from the comparators Ca and Cp and the detection bit D from the previous stage and supplying the new detection bit D'. The bit D' has value 1 if the bit D has value 1 and if the amplitude A is higher than the two thresholds Sa and Sp. Otherwise it takes the value 0.

The anterior thresholds, for the delays R from −1 to −L, are supplied by an anterior threshold generator 107 while the posterior thresholds, for the delays R from +1 to +L, are supplied by a posterior threshold generator 106.

The anterior thresholds are worked out from the amplitudes at input to the device and from the number of the channel containing the maximum amplitude. The posterior thresholds are worked out from the amplitudes appearing at the output from the device and from the number of the channel containing the maximum output amplitude. This number is obtained by putting a parallel channel for progression of the number i supplied by the circuit 104 through L+1 registers R'' 117, 127, ..., 157.

The generators 106 and 107 are strictly identical in structure.

The generator 107 is represented in part in FIG. 10. It possesses a selection circuit 1070 which selects, under the control of the number i from the circuit 104, the maximum amplitude Amax received at the input. The number i also addresses for each stage a ROM memory 1071, 1075, ... containing all the coefficients $K_{ij}$ for the delay corresponding to the stage being considered. Thus, the memory 1071 contains all the coefficients $K_{ij}(-1)$ for all values of i and of j, i corresponding to the channel with the maximum amplitude. The selected coefficients $K_{ij}$ (with varying from 1 to 3) are sent to multipliers 1072 to 1074, 1076 to 1078, which calculate the products $K_{ij}$. Amax=$S_{ij}$ and therefore give the corresponding threshold values.

It is clear that the same circuit (selection circuit, ROM memory and multipliers) is provided for circuit 105.

The operation of the device in FIG. 8 thus appears clearly. The amplitudes appearing at the input of the device serve to calculate the anterior thresholds which are compared to the corresponding anterior amplitudes present in the various stages of the device, enabling elimination of the bits for detection of amplitudes of detected secondary peaks, when the maximum amplitude at input becomes higher. In the same way, the amplitudes appearing at the output from the device serve to calculate the posterior thresholds which are compared to the corresponding posterior amplitudes which are present in the various stages of the device, which enables elimination of the bits for detection of amplitudes of detected secondary peaks, when the maximum amplitude at the output is notably higher.

Of course, the examples of the embodiment described are in no way restrictive of the invention.

What is claimed is:

1. A method for detecting without distance ambiguity, a target presenting flashes of very short duration and high period using a coherent pulse radar, said method comprising the steps of:

periodically transmitting a pattern of N pulses having the same carrier frequency, coherent with each other and each phase modulated by a different modulation law, said pulses of a pattern being time spaced by different intervals which are substantially the period of the pattern divided by N, and having a magnitude substantially equal to the duration of the flashes;

receiving said pulses by a single receiver having N processing channels, respectively corresponding to said modulation laws to perform pulse compression of said pulses; and eliminating the secondary peaks received with said pulses by comparing the signal levels received in each of the channels.

2. A method according to claim 1, wherein said modulation laws use pseudo-orthogonal codes.

3. A method according to claim 1, wherein, in said single receiver, the clutter and echo of a target body received with said pulses are eliminated.

4. A method according to claim 1, wherein the intervals between two successive pulses of said pattern are chosen so that, for the duration of the pattern, each distance is observable in a predetermined minimum number of channels.

5. A method according to claim 4, wherein, each interval between two successive pulses of said pattern is expressed in numerical form Ti as a function of a quantification step Tq equal to the inobservability time of the radar during each emission of a pulse, the intervals Ti are selected such that all the values Ti, Ti+Ti⊕1, ... , Ti+Ti⊕1+ ... +Ti⊕N⊖2 are different, where i varies from 1 to N and where ⊕ and ⊖ respectively symbolize addition and subtraction modulo N.

6. A method according to claim 5, wherein the step of eliminating the secondary peaks received consists of:

comparing the amplitudes received in the N processing channels with each other to determine the channel containing the maximum amplitude at each instant;

determining a simultaneous threshold, L anterior thresholds Saij(R) and L posterior thresholds Spij(R) for each channel from the maximum amplitude Ai, the number i of the channel which receives it and the values of the autocorrelation and intercollation functions appropriate to each processing channel where L corresponds to the number of moments of each modulation law;

comparing the amplitudes received at the instant considered with the simultaneous thresholds and the corresponding anterior and posterior thresholds determined respectively for the L anterior and posterior instants, to determine that said maximum amplitude corresponds to the detection of a main peak of a target if it is greater than all the thresholds with which it is compared.

7. A coherent pulse radar system detecting a target having flashes of a very short duration and a high periodic rate comprising:

a pulse transmitter for producing coherent pulses of the same frequency in a pattern of N pulses, pulses of a pattern being spaced at different time intervals substantially equal to the period of the pattern divided by N;

means for phase modulating each pulse of said pattern according to a different phase modulation law;

a single receiver to receive echo pulses from said target in response to said pattern of pulses;

means for coherently eliminating radar clutter and echo pulses from a body of said target leaving pulses produced from said flashes;

N processing channels for compressing each of the echo pulses produced from said flashes by correlating the signal received with a respective phase law associated with a pulse of said patterns; and means for eliminating secondary signal peaks in said processing channels to provide main pulse signal peaks in each channel.

8. A coherent pulse radar system according to claim 7, wherein each processing channel includes a threshold device to eliminate residual noise.

9. A coherent pulse radar system according to claim 8, wherein said device for elimination of secondary peaks comprises:

first means for determining at each instant the number i of said channel which gives the maximum amplitude;

second means for determining N simultaneous thresholds from said maximum signal amplitude Ai and from the number of said channel i, giving the maximum signal amplitude, comparing said signal amplitudes received in the N channels with said respective instantaneous thresholds and transmitting the signal amplitude in each of the channels and an indication of detection of each of the channels where the signal amplitude is greater than said simultaneous threshold;

third means for storing and shifting L previously received signal amplitudes in each of said N processing channels, comparing them at each instant respectively with L anterior thresholds and L posterior thresholds and storing and shifting the results of these comparisons;

fourth means for calculating said anterior thresholds from said maximum amplitude received, from the number of the channel receiving said maximum amplitude and from the autocorrelation and intercorrelation functions of said phase modulation laws;

fifth means for calculating said posterior thresholds from said maximum amplitude delivered at the output from said third means, from the number of the channel delivering said maximum amplitude at the output from said third means and from said functions; and sixth means for transferring to said fifth means the number of the channel receiving the maximum amplitude in synchronism with the storing and shifting of said amplitude in said third means.

10. A coherent pulse radar system according to claim 9, wherein said fourth means comprises, for the generation of each set of N anterior thresholds corresponding to a given anterior number, $-1$ to $-L$, with respect to the amplitudes received by said second means, a ROM memory containing threshold coefficients, addressed by the number i of the channel receiving the maximum amplitude and producing N selected coefficients, a selection circuit receiving said amplitudes received on the N channels and said number and selecting said maximum amplitude and N multipliers receiving the selected coefficients and the maximum amplitude and giving said N anterior thresholds.

11. A coherent pulse radar system according to claim 9, wherein said fifth means comprise, for the generation of each set of N posterior thresholds corresponding to a given posterior number, $+1$ to $+L$, with respect to the signal amplitudes delivered from said third means, a ROM memory containing the threshold coefficients, addressed by the number of the channel delivering the maximum signal amplitude and producing N selected coefficients, a selection circuit receiving the signal amplitudes delivered on the N channels and the number delivered by said sixth means and selecting the maximum signal amplitude, and N multipliers for receiving the selected coefficients and the maximum amplitude and producing therefrom said N posterior thresholds.

* * * * *